Nov. 28, 1933.　　　　C. C. HEETER　　　　1,936,669
RELEASE COUPLING
Filed Feb. 4, 1931
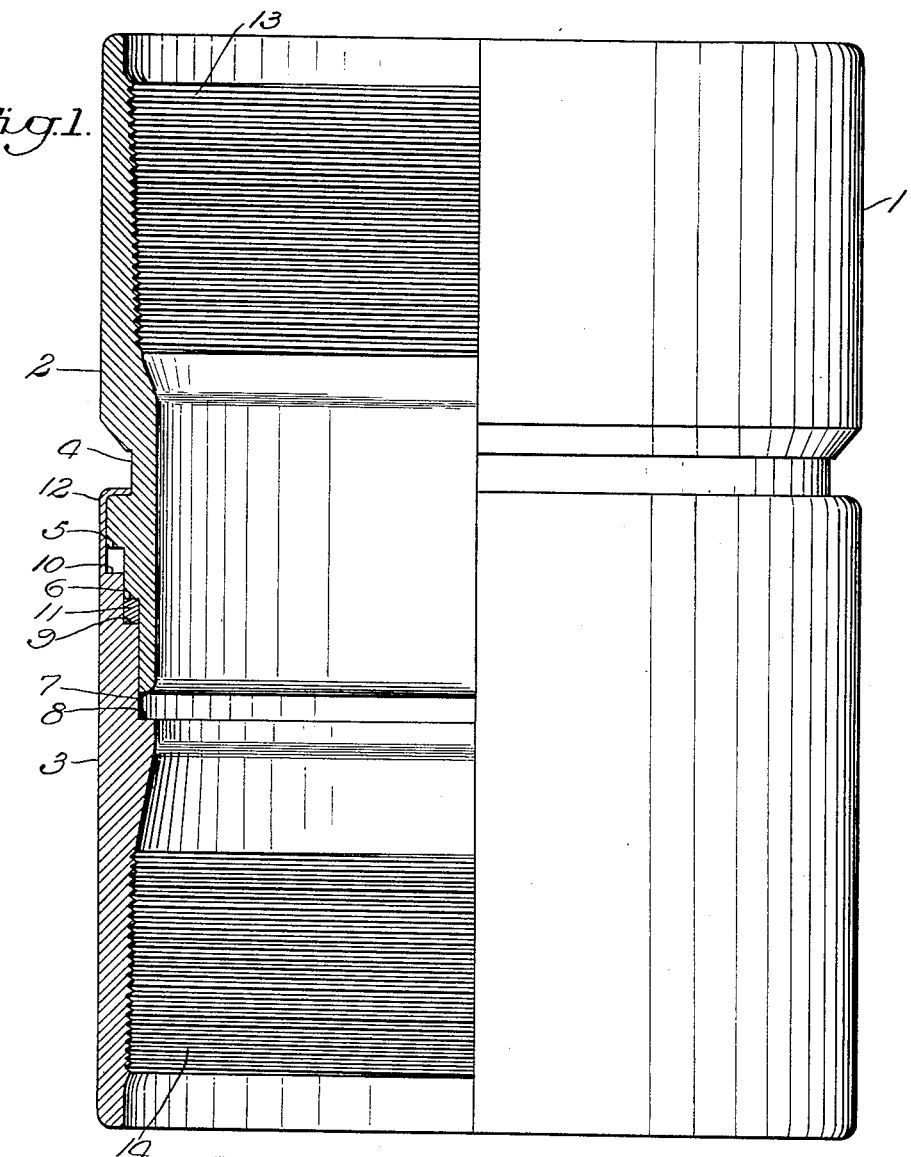
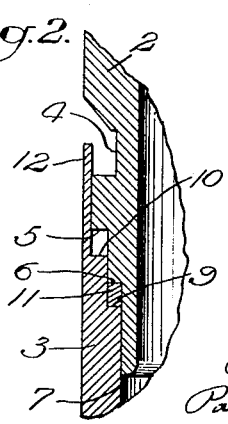
INVENTOR
Colonel C. Heeter
By Byrnes, Stebbins,
Parmelee & Blenko, his Attys Patented Nov. 28, 1933                                                          1,936,669

UNITED STATES PATENT OFFICE 1,936,669

RELEASE COUPLING

Colonel C. Heeter, Butler, Pa.

Application February 4, 1931. Serial No. 513,309

3 Claims. (Cl. 285—146)

My invention relates to release couplings, and more particularly to release couplings for oil well casing.

It becomes desirable at times to pull casing from the well. For example, it may be decided to abandon the well or to renew the old casing of the well, because of corrosion or the like.

I provide a coupling that is moisture-tight and which will release only when the lifting force applied from above the joint is greater than the weight of the casing below the joint. This is desirable for the reason that the casing below the joint may be saved provided it is not stuck in the well. If it is fast the coupling releases and leaves it in place.

My improved release casing coupling will not release due to the weight of the casing above it, but such weight makes the joint more efficient, as will be explained below.

My invention is illustrated by the modification shown in the accompanying drawing in which, Figure 1 is an elevational view of my coupling partly broken away to show a vertical section, and Figure 2 is a vertical sectional view of the coupling before its final assembly.

Referring to the drawing, 1 is a release coupling comprising a male element 2 and a female element 3. The male element 2 is provided with an annular recess 4 and with a plurality of annular shoulders 5, 6, and 7 that are stepped toward the inside of the pipe element 2. The female element 3 is similarly provided with shoulders 8, 9 and 10 that are adapted to register with the shoulders 7, 6 and 4, respectively, when the male member is telescoped in the female member as illustrated.

A ring 11 of resilient material, such as lead and/or rubber or the like, is placed between the mid-shoulders 6 and 9 of the male and female members, respectively. When the members 2 and 3 are forced toward each other, the resilient ring 11 is entrapped and forms a moisture-tight seal between the inside and the outside of the coupling.

An annular extension 12 is provided on the end of the female member 3. This extension 12 is turned, folded or crimped over the bottom of the annular recess 4 in the male member 2 for securing the member together and for compressing the lead ring 11. Figure 2 shows the extension before it has been turned over the bottom of the recess 4.

The coupling 1 is placed in the casing by screwing sections of the latter into the threaded portions 13 and 14 of the male and female elements respectively. The coupling is positioned one or two joints from the bottom of the casing. When the casing is pulled, if the bottom is free, the joint will not break, however, if the bottom is stuck the coupling will release and leave all of the casing below the coupling in the hole. The coupling is released by the turned extension 12 opening up as shown in Figure 2.

In operation, the weight of the casing above the coupling assists the extension 12 in jamming the elements of the coupling together to cause the ring 11 to form a more perfect moisture-tight joint.

The strength of the release coupling is made such that the casing may be raised and lowered without the coupling releasing, but as soon as the casing below the coupling becomes fast the coupling will release, upon sufficient lifting force being applied to the casing above the coupling. This saves the releasing of the coupling until it is necessary, and to release the coupling the force must be a lifting force from above the coupling.

The element of the coupling removed from the hole with the upper casing may be readily used again to form another coupling with a new element substituted for the one left in the hole.

Various changes may be made in the modification described without departing from the scope of the following claims.

I claim:

1. A release coupling comprising telescoping tubular elements having interfitting ends decreasing in wall thickness by steps, a ring of resilient material enclosed within abutting steps on said ends, and means for securing said members together, including an annular recess on one of said elements and an annular extension on the other element bent over to enter said recess.

2. A device of the character described comprising male and female elements with stepped ends, packing enclosed in the space between two opposing steps, and means for securing said elements together, including an extension on one member flanged over a projection on the other.

3. A release coupling comprising a male member having an annular recess near its end and a plurality of annular stepped shoulders below said recess, a female member having a plurality of similar annular stepped shoulders registering with the shoulders on said male member, a ring of resilient material separating at least two of said registering shoulders, and an annular extension on said female member turned into the annular recess in said male member for securing said members together.

COLONEL C. HEETER.